Sept. 26, 1950 S. V. SWETLIK 2,523,736
FISH HOLDER
Filed Sept. 26, 1947

INVENTOR.
SYLVAN V. SWETLIK
BY
McMorrow, Berman & Davidson
ATTORNEYS

Patented Sept. 26, 1950

2,523,736

UNITED STATES PATENT OFFICE 2,523,736

FISH HOLDER

Sylvan V. Swetlik, Kellnersville, Wis.

Application September 26, 1947, Serial No. 776,209

1 Claim. (Cl. 17—8)

This invention relates to a fish holder, and more particularly to a device adapted to be used in cleaning and scaling fish for maintaining the same securely in a suitable position to be operated upon.

The invention has for its chief object the provision of a device for use with various sizes of fish, to rigidly hold the same in position so that the operator will have both hands free for the cleaning and scaling operations.

A further object of the invention is to provide a fish-holding device of simple design and rugged construction, capable of being easily cleaned, and maintained in working condition.

Other objects and advantages of the invention will be readily apparent from the following description of the same, when taken in conjunction with the annexed drawings.

Briefly stated, the invention comprises a base member having a centrally-disposed slot, and a handle pivoted to said base member carrying sharply pointed prongs adapted to penetrate a fish placed on the base member, and to extend into the slot in the same. Means is provided for limiting the movement of the prongs in penetrating the fish, and the base member is formed to permit a close engagement with the body of the fish, in order to more securely maintain the same in convenient position for the dressing operations.

Figure 1:
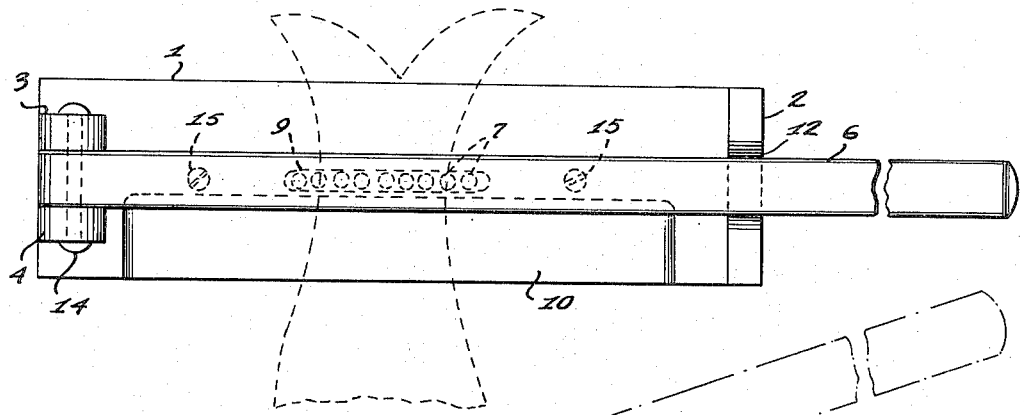
Figure 1 is a top plan view of the fish holder.

Referring to the drawings in greater detail, the fish holder comprises a base member 1 having an upwardly-extending end portion 2, and at the opposite end a pair of upwardly projecting lugs 3 and 4, to which a handle 6 is pivotally secured, said handle carrying downwardly-projecting prongs 7.

Figure 4:
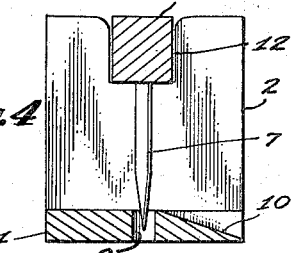
Figure 4 is a cross-sectional view taken along the line 4—4 of Figure 2, looking in the direction indicated by the arrows.
Figure 5:
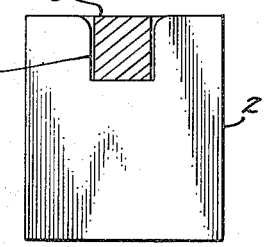
Figure 5 is an end view, partly in cross-section, taken along the line 5—5 of Figure 2, looking in the direction indicated by the arrows.
Figure 6:
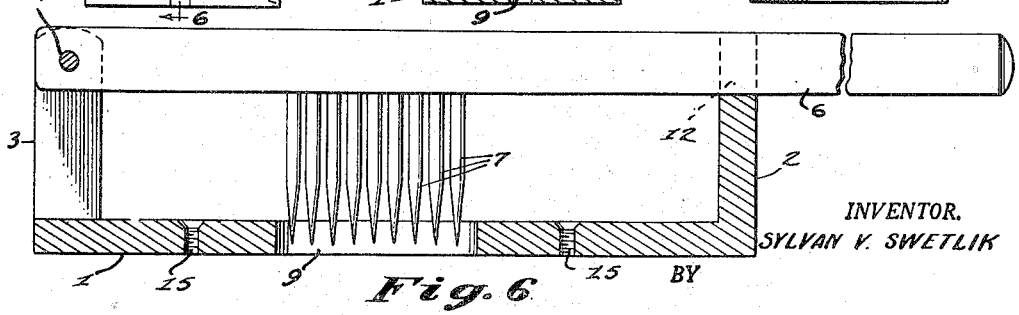
Figure 6 is a longitudinal cross-sectional view of the invention, taken along the line 6—6 of Figure 3, looking in the direction indicated by the arrows.

The base 1 is formed with a centrally-located, longitudinal slot 9, into which the points of the prongs 7 extend when the handle 6 is in its lowermost position. As best seen in Figures 1 and 4, the base 1 is cut away at one side to form a sloping portion 10 adapted to closely engage the fish in the region of its tail.

The end 2 of the base member is formed with a notch 12 for the reception of the handle 6 in its lowermost position, and forming a stop to limit downward movement of the handle. The handle 6 is pivotally secured between the lugs 3 and 4 by a pin 14, and this connection is at a height above the base member 1 such that the handle in its lowermost position will be parallel with the base 1, thus determining the distance which the projections 7 extend into the slot 9 in the base.

The prongs 7 are secured to the handle 6, extending downwardly therefrom in a location to enter the slot 9 in the base when the handle is moved downwardly into engagement with the notch 12 in the end portion 2, and these prongs preferably have very sharp points at their free ends in order that the same may readily penetrate a fish positioned on the base member over the slot 9.

The base 1 may conveniently be provided with screw holes 15 for the accommodation of screws or other fastening means used to secure the holder to a support.

The above-described structure may be formed of any suitable material, preferably of rust-resisting character, such as cast aluminum, or other non-rusting metal, the prongs being preferably made of a hard material, such as stainless steel, which is capable of being sharply pointed and resisting wear.

Figure 2:
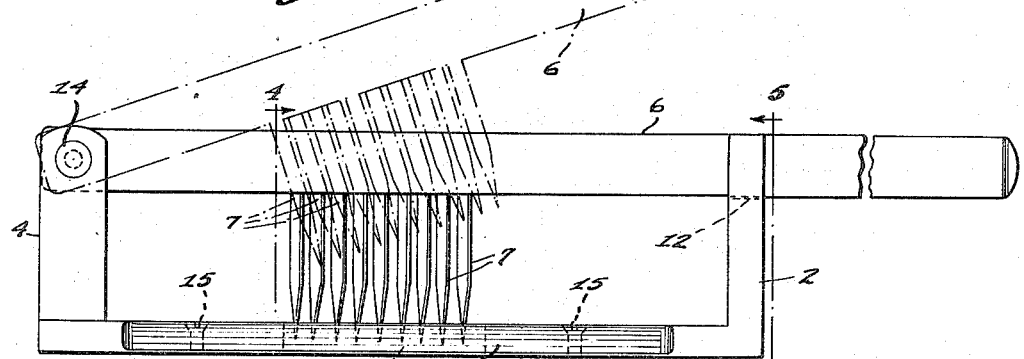
Figure 2 is a side elevational view of the same.
Figure 3:
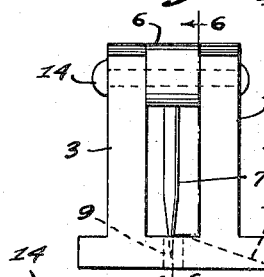
Figure 3 is an end elevational view of the fish holder, looking at the left end of the device as illustrated in Figure 1.

In using the invention, the device is secured to a suitable support by fastening means extending through the holes 15, the supporting structure, not shown, preferably having a flat surface to maintain the fish in convenient position for dressing the same. The handle 6 is raised, as indicated in dotted lines in Figure 2, and a fish is laid on the base 1 with its tail portion positioned over the slot 9, and the region just forwardly of the tail in engagement with the sloping portion 10. The handle 6 is then moved to its lowermost position, engaging the notch 12, and causing the points of the prongs 7 to penetrate the fish and extend into the slot 9. As the points of the prongs penetrate the fish, the handle enters the notch in the end portion 2, thus guiding the points into the slot and preventing deflection of the points from the slot due to engagement with the backbone of the fish.

When used as just described, the fish holder provides a means for securely maintaining a fish in convenient position for dressing the same, and leaves the operator with both hands free, thus greatly reducing the time and labor required in such work.

The sloping surface 10 on the base permits the fish to lie straight on the support without forming a hump adjacent the holding device, as would be the case if such a cut-away portion were not provided.

It will be apparent that the limitation of the distance to which the prongs 7 project into the slot 9 by the engagement of the handle 6 in the notch 12, as well as the provision of the sloping surface 10, promotes the uniform and tenacious gripping of the fish in the holder, and also enables the same to be easily disengaged.

While the invention has been described with reference to a particular embodiment of the same, it will be understood that many changes can be made in the proportions of the various parts, as well as in the materials employed, without departing from the spirit of the invention, or the scope of the appended claim.

Having now clearly shown and described the invention, what is claimed as new and desired to secure by Letters Patent is:

A fish clamp comprising an elongated flat base having a longitudinal extending slot therein and a beveled edge providing a sloping surface extending outwardly and downwardly from one side of said slot, said slot being disposed substantially along the midwidth location of said base and substantially symmetrical with the midwidth location of the latter, a pair of spaced apart lugs upstanding from said base near one end of the latter and spaced from the adjacent end of said slot, an elongated handle, means pivotally connecting said handle at one end to said lugs at the upper end of the latter so that said handle extends along and above the slot in said base, a series of spaced apart prongs extending downwardly from said handle and having pointed lower ends receivable in said slot, and an abutment block upstanding from said base near the end of the latter remote from said lugs and spaced from the adjacent end of said slot, said abutment block having a handle receiving notch in its upper end, said prongs being effective to clamp a fish against said base and said lugs and said abutment block being effective to hold said handle against lateral movement during cleaning of a fish secured in said fish clamp.

SYLVAN V. SWETLIK.

REFERENCES CITED

The following references are of record in the file of this patent:

UNITED STATES PATENTS

| Number | Name | Date |
|---|---|---|
| 1,353,981 | Bahde | Sept. 28, 1920 |

FOREIGN PATENTS

| Number | Country | Date |
|---|---|---|
| 43,852 | Sweden | Apr. 3, 1918 |
| 523,002 | Germany | Apr. 18, 1931 |